US010728135B2

(12) United States Patent
Raney

(10) Patent No.: US 10,728,135 B2
(45) Date of Patent: Jul. 28, 2020

(54) LOCATION BASED TEST AGENT DEPLOYMENT IN VIRTUAL PROCESSING ENVIRONMENTS

(71) Applicant: Keysight Technologies, Inc., Minneapolis, MN (US)

(72) Inventor: Kristopher Raney, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 198 days.

(21) Appl. No.: 15/783,715

(22) Filed: Oct. 13, 2017

(65) Prior Publication Data

US 2019/0116110 A1 Apr. 18, 2019

(51) Int. Cl.
| | | |
|---|---|---|
| H04L 12/26 | (2006.01) |
| G06F 8/60 | (2018.01) |
| H04L 29/08 | (2006.01) |
| G06F 9/455 | (2018.01) |

(52) U.S. Cl.
CPC ............ H04L 43/50 (2013.01); G06F 8/60 (2013.01); G06F 9/45533 (2013.01); H04L 43/12 (2013.01); H04L 67/18 (2013.01); H04L 67/325 (2013.01); H04L 67/34 (2013.01); G06F 9/455 (2013.01); H04L 67/10 (2013.01)

(58) Field of Classification Search
None
See application file for complete search history.

(56) References Cited

U.S. PATENT DOCUMENTS

| | | |
|---|---|---|
| 9,110,703 B2 | 8/2015 | Santos et al. |
| 9,680,728 B2 | 6/2017 | Besser |
| 10,205,648 B1* | 2/2019 | Guo .................. H04L 43/12 |
| 2008/0192624 A1* | 8/2008 | de Frias Rebelo Nunes ............... H04L 12/437 370/223 |
| 2010/0094981 A1* | 4/2010 | Cordray .................. H04L 41/20 709/222 |
| 2011/0004698 A1 | 1/2011 | Wu |

(Continued)

OTHER PUBLICATIONS

Ixia, Ixia xFilter, Data Sheet, 5 pgs. (May 2015).

(Continued)

Primary Examiner — Hassan A Phillips
Assistant Examiner — Gautam Sharma

(57) ABSTRACT

Systems and methods are disclosed for location based deployment of test agents in a cloud environment based upon deployment information for previously placed customer processing nodes. The cloud environment is hosted by servers operating to provide cloud services within two or more server zones. A test controller receives deployment information about applications operating with the cloud environment, analyzes the deployment information to determine locations within the cloud environment for deployment of test agents where the locations are associated with a plurality of the applications, sends resource requests to a cloud management controller to deploy the test agents at the locations, and receives test results from the test agents deployed by the cloud management controller at the locations based upon the resource requests. Monitor agents operating along with applications deployed in the cloud can also be used to provide the deployment information to the test controller.

26 Claims, 10 Drawing Sheets

(56) References Cited

U.S. PATENT DOCUMENTS

| | | | |
|---|---|---|---|
| 2011/0044291 A1* | 2/2011 | Omar | H04W 60/04 370/332 |
| 2013/0031233 A1 | 1/2013 | Feng et al. | |
| 2013/0205376 A1* | 8/2013 | Narasimha | H04L 9/3247 726/6 |
| 2013/0291109 A1 | 10/2013 | Staniford et al. | |
| 2014/0229605 A1 | 8/2014 | Besser | |
| 2015/0113132 A1* | 4/2015 | Srinivas | H04L 41/0816 709/224 |
| 2015/0263889 A1* | 9/2015 | Newton | H04L 47/10 370/254 |
| 2015/0319030 A1* | 11/2015 | Nachum | H04L 43/02 370/250 |
| 2016/0087859 A1* | 3/2016 | Kuan | H04L 43/0817 715/736 |
| 2016/0094418 A1 | 3/2016 | Raney | |
| 2016/0110211 A1 | 4/2016 | Karnes | |
| 2016/0248655 A1* | 8/2016 | Francisco | H04L 43/028 |
| 2016/0277249 A1* | 9/2016 | Singh | H04L 67/02 |
| 2016/0285685 A1* | 9/2016 | Zhou | H04L 41/0816 |
| 2017/0093648 A1* | 3/2017 | ElArabawy | H04L 41/5067 |
| 2017/0099195 A1 | 4/2017 | Raney | |
| 2017/0118102 A1 | 4/2017 | Majumder et al. | |
| 2017/0163510 A1 | 6/2017 | Arora et al. | |
| 2017/0237633 A1* | 8/2017 | Hegde | H04L 43/028 370/252 |
| 2017/0318053 A1* | 11/2017 | Singh | H04L 63/1491 |
| 2017/0374103 A1* | 12/2017 | Testu | G06F 12/08 |
| 2018/0091387 A1* | 3/2018 | Levi | H04L 43/028 |

OTHER PUBLICATIONS

Ixia, Ixia Phantom vTap With TapFlow Filtering, Data Sheet, 4 pgs. (Jul. 2015).

Ixia, Ixia Hex Tap, Data Sheet, 5 pgs. (Oct. 2015).

Hofstede et al., "How Monitoring Explained: From Packet Capture to Data Analysis With NetFlow and IPFIX", IEEE, 31 pgs. (May 2014).

Wikipedia, "Kubernetes", Jul. 2017, 6 pgs.

Spirent, White Paper, "NFV Validation Across Boundaries", 2015, 9 pgs.

\* cited by examiner

US 10,728,135 B2

LOCATION BASED TEST AGENT DEPLOYMENT IN VIRTUAL PROCESSING ENVIRONMENTS

TECHNICAL FIELD

This invention relates to monitoring network packets within network communication systems and, more particularly, to monitoring network packets within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), switched port analyzer (SPAN) ports available on network switch systems, and/or other tap devices operating within a network communication system. Network packet brokers (NPBs) can also be used to monitor network traffic and forward filtered traffic to destination monitoring tools.

Testing of network packet communications can also be desirable in network environments. Network testing often involves introduction of test packets into a network environment, collection of the test packets after they have processed by the network environment, and comparison of the test packets to the processed packets. This comparison can provided information about the functioning of the network, such as packet drops, data corruption, packet delays, and/or other potential error conditions or parameters for the network environment.

Certain network systems also include virtual processing environments hosted by one or more host servers. For example, network applications and resources can be made available to network-connected systems as virtualized resources operating within virtualization layers on host servers. In some embodiments, processors or other programmable integrated circuits associated with a server (e.g., server blade) and/or combinations of such servers operate to provide such virtual resources. These hosted virtual processing resources can then be made available to network-connected systems and devices.

Cloud computing services (e.g., Amazon Web Services) can employ a variety of different architectures for provisioning, managing, administering, and orchestrating virtualized computing and storage resources, such as application servers and data storage arrays. For example, cloud service providers often interact with customers to sell/provide them with access to cloud computing resources, where such cloud computing resources include physical servers, data storage arrays, and/or other processing resources. Use of these processing resources, such as through deployment and management of containers, virtual machines, and associated applications within a set of cloud resources is typically provided by controllers within cloud management architectures (e.g., Kubernetes, Mesos, etc.). These cloud management controllers manage, replicate, and schedule virtual resources that can be used to scale up or down processing node deployments requested by customers within allocated sets of cloud resources. Such an architecture, however, tends to deploy processing nodes (e.g., Docker containers, virtual machines, etc.) across a diverse range of geographic locations and related server resources for the purposes of increasing overall service resiliency in the face of geographic-dependent failures.

When network packet testing is desired within virtual processing environments, difficulties can arise with respect to placing testing assets within desired locations within the virtual processing environment. Current cloud service providers (e.g., Amazon Web Services) provide some limited ability to identify regions (e.g., US-east1, US-east2, US-east3, etc.) within which requested cloud resources will be located by the cloud management controller when cloud processing nodes are activated and placed. Limited ability is also provided to identify placement within particular server zones (e.g., availability zones within a given region such as US-east1). However, specific deployment of processing nodes by a customer within particular data centers within these different availability zones (e.g., multiple redundant data centers within each availability zone in US-east1 region) is typically not provided by cloud service providers. Rather, deployment of processing nodes is typically implemented by a cloud service provider based upon resource availability and load balancing algorithms determined by the cloud service provider.

One technique to provision testing for processing nodes is for cloud service customers to place a test agent with each application requested to be deployed within the cloud. For example, where applications are being activated within a cloud, test agents are activated and paired along with them. However, for such paired deployments, the customer pays for the test agent resources regardless of whether tests are being actively run because the resources are allocated by the cloud service provider upon deployment of the paired test agents.

FIG. 1A (Prior Art) is a block diagram of an example embodiment 100 for customer nodes deployed within a cloud environment. For example, a cloud management controller 102 for a cloud service provider receives resource requests 106 from a customer controller 104. These resource requests 106 can include requests to activate processing nodes within the cloud environment. For the example embodiment 100, a cloud region 105 is shown with three server zones 108, 110, and 112. An application (APP) 114 and a paired test agent 116 have been requested and activated in a first server zone (ZONE1) 108. An application (APP) 124 and a paired test agent 126 have been requested and activated in a second server zone (ZONE2) 110. The third server zone (ZONE3) for this example embodiment 100 does not have activated processing nodes for the customer.

In operation, the application 114 communicates with the application 124 with respect to desired network communications and related services for the customer. For example, the application 124 and the application 114 could be part of a video streaming service being provided by the customer (e.g., Netflix). The test agents 116/126 operate to collect test data associated with these network communications and forward this test data through communications 118/128 to the customer controller 104. The customer controller 104 can in turn control the test agents 116/126. However, regardless of whether testing is currently being run or is idle, the customer still pays for the resources used by the paired test agents 116/126 that have been deployed with the applications 114/124, respectively.

In addition to this cost of idle resources, cloud nodes can be moved by the cloud management controller 102 when failures occur and/or can be placed by the cloud management controller 102 in locations that are undesirable for testing purposes. For example, cloud nodes can be moved to fail-over locations in different data centers within server zones 108/110/112 for a particular region 105 or potentially to different server zones.

FIG. 1B (Prior Art) is a block diagram of an example embodiment 150 where the application in the first cloud zone (ZONE1) 108 has failed and has been moved to the third cloud zone (ZONE3) 112. In particular, the original application 114A and paired test agent 116A have failed. After detection of this failure, the cloud management controller 102 has created new application 114B and paired test agent 116B within the third cloud zone 112. In operation, the test agents 116B/126 still collect test data associated with these network communications and forward this test data through communications 118/128 to the customer controller 104. However, the customer controller 104 may not be aware that the test data being received through communications 118 from test agent 116B are from a newly formed resource in the third cloud zone 112 due to the failure of the application 114A.

SUMMARY

Systems and methods are disclosed for location based test agent deployment in virtual processing environments. Various embodiments are disclosed and different features and variations can be implemented and utilized.

For one embodiment, a method is disclosed to deploy test agents in a cloud environment hosted by servers operating to provide cloud services within two or more server zones. The method includes at a test controller receiving deployment information about applications operating with the cloud environment, analyzing the deployment information to determine locations within the cloud environment for deployment of test agents where the locations being associated with a plurality of the applications, sending resource requests to a cloud management controller to deploy the test agents at the locations, and after deployment of the test agents, receiving test results from the test agents deployed by the cloud management controller at the locations based upon the resource requests.

In additional embodiments, the locations determined from the deployment information include at least one of geographic locations or network subnet locations. In further embodiments, the deployment information includes at least one of a server zone, a geographic region, an IP (Internet Protocol) address, a range of IP addresses, a data center identifier, a server identifier, a cluster identifier, a host identifier, or a geo-location identifier. In still further embodiments, the deployment information includes information about processes being run by the applications.

In additional embodiments, the method further includes, at the applications, running monitor agents to monitor network traffic for the applications. In further embodiments, the method includes, at the monitor agents, collecting the deployment information and sending the deployment information to the test controller. In still further embodiments, the method includes, at the monitor agents, collecting the deployment information and sending the deployment information to a monitor controller and includes, at the test controller, querying the monitor controller to receive the deployment information.

In additional embodiments, the method includes, at the test controller, querying the cloud management controller to receive the deployment information.

In additional embodiments, the sending includes, for each test agent, first sending a reserve request for the test agent to the cloud management controller and subsequently sending an activation request for the test agent. In further embodiments, the method includes, at the cloud management controller, storing reserve requests for test agents and deploying the test agents only after receiving the activation requests.

In additional embodiments, the method includes, at the test controller, analyzing the test results and adjusting deployed test agents based upon the test results. In further embodiments, the method includes, at the test controller, controlling the test agents to emulate application traffic. In still further embodiments, the cloud management controller is a Kubernetes master controller, and the applications and test agents operate within Kubernetes pods on Kubernetes nodes.

In one embodiment, a system is disclosed to deploy test agents in a cloud environment hosted by servers operating to provide cloud services within two or more server zones. The system includes a test controller having one or more programmable integrated circuits, including at least one of a processor or a programmable logic device, programmed to receive deployment information about applications operating with the cloud environment, analyze the deployment information to determine locations within the cloud environment for deployment of test agents where the locations are associated with a plurality of the applications, send resource requests to a cloud management controller to deploy the test agents at the locations, and after deployment of the test agents, receive test results from the test agents deployed by the cloud management controller at the locations based upon the resource requests.

In additional embodiments, the locations determined from the deployment information include at least one of geographic locations or network subnet locations. In further embodiments, the deployment information includes at least one of a server zone, a geographic region, an IP (Internet Protocol) address, a range of IP addresses, a data center identifier, a server identifier, a cluster identifier, a host identifier, or a geo-location identifier. In still further embodiments, the deployment information includes information about processes being run by the applications.

In additional embodiments, the system includes monitor agents configured to operate with the applications to monitor network traffic for the applications. In further embodiments, the monitor agents are further configured to collect the deployment information and send the deployment information to the test controller. In still further embodiments, the monitor agents are further configured to collect the deployment information and send the deployment information a monitor controller, and the test controller is further programmed to query the monitor controller to receive the deployment information.

In additional embodiments, the test controller is further programmed to query the cloud management controller to receive the deployment information.

In additional embodiments, the test controller is programmed, for each test agent, to first send a reserve request for the test agent to the cloud management controller and subsequently to send an activation request for the test agent. In further embodiments, the system includes the cloud management controller, and the cloud management controller is configured to store reserve requests for test agents and to deploy the test agents only after receiving the activation requests.

In additional embodiments, the test controller is further programmed to analyze the test results and to adjust deployed test agents based upon the test results. In further embodiments, the test controller is further programmed to control the test agents to emulate application traffic. In still further embodiments, the system includes a Kubernetes master controller configured to operate as the cloud management controller and Kubernetes nodes configured to run the applications and the test agents.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION

Systems and methods are disclosed for location based deployment of test agents in a cloud environment based upon deployment information for previously placed customer processing nodes. This dynamic deployment of test agents avoids costs associated with pre-deployment of unneeded test agents and also allows for tracking of relocated processing nodes due to fail-over processing and/or other load balancing by the management controller of the cloud service resources. Various embodiments are disclosed and different features and variations can be implemented and utilized.

For the embodiments disclosed, test agents are deployed within a cloud environment based upon deployment information for customer processing nodes previously deployed and operating within the cloud environment. This location based deployment of test agents allows for the test system to test traffic scenarios that involve test traffic that originates from or is delivered to certain specific geographic locations within the cloud environment. Also, this location based deployment can be used to reduce bandwidth usage and costs associated with certain test scenarios by intelligently placing test agents in areas within the cloud that are co-located with the applications under test. These dynamically placed test agents also allow (1) generating test traffic that is suitable for testing a targeted cloud-deployed application, (2) monitoring packet traffic associated with the test, and (3) dynamically adjusting the placement of test agents and/or monitoring taps to specific locations within the cloud environment. Other variations can also be implemented and advantages achieved while still taking advantage of the techniques described herein.

Figure 2:
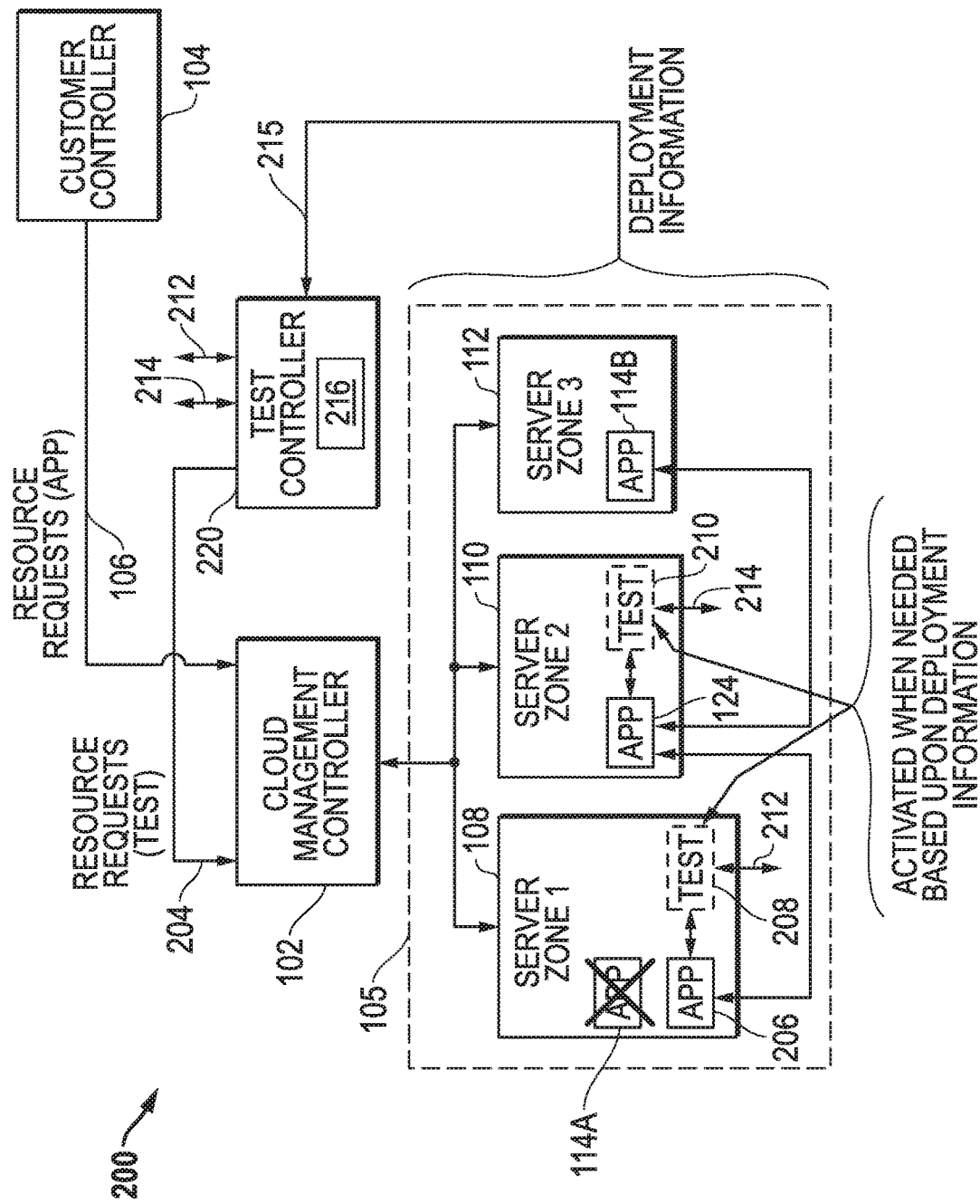
FIG. 2 is a block diagram of an example embodiment for a cloud environment where test agents are dynamically deployed based upon deployment information for customer applications previously deployed within the cloud environment.

FIG. 2 is a block diagram of an example embodiment 200 for a cloud environment where test agents are dynamically deployed based upon deployment information for customer applications previously deployed within the cloud environment. The cloud management controller 102 for a cloud service provider receives processing resource requests 106 from a customer controller 104. These processing resource requests 106 can include requests to activate processing resources within the cloud environment, such as applications (APPs) and/or other processing resources. For the example embodiment 200, a cloud region 105 is shown with three server zones 108, 110, and 112. An application 114A was originally requested and activated in a first server zone (ZONE1) 108; however, this application 114A has failed and has been restarted as application 114B in a third server zone (ZONE3) 112. An application 124 has been requested and activated in a second server zone (ZONE2) 110, and an application 206 was requested and activated in a first server zone (ZONE1) 108. In operation, the application 114B and application 206 communicate with the application (APP) 124 with respect to desired network communications and related services for the customer. For example, the applications 124, 114B, and 206 could be part of a video streaming service being provided by the customer (e.g., Netflix).

Figure 1B:
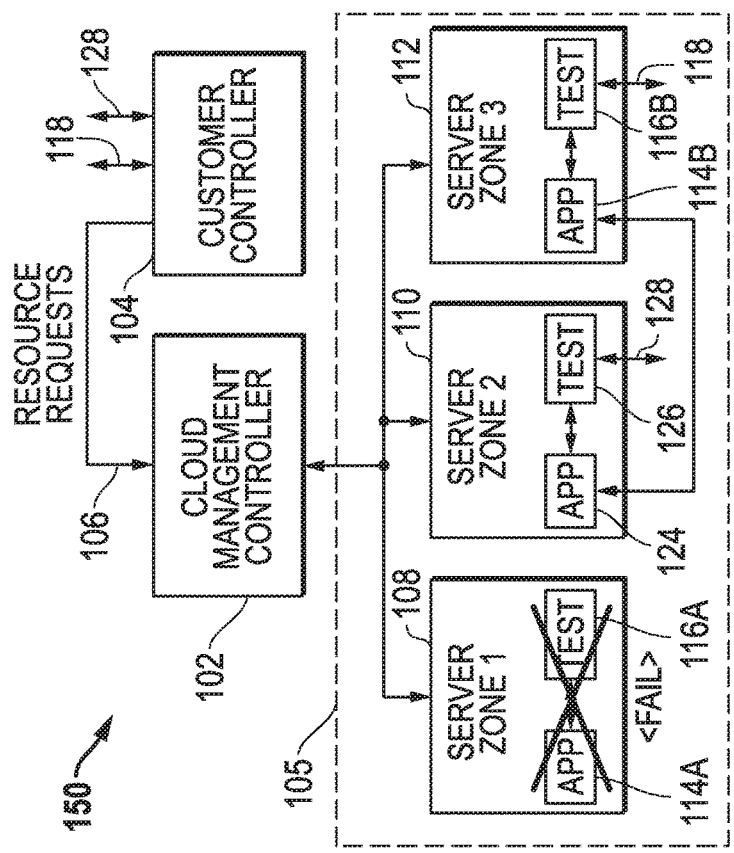
FIG. 1B (Prior Art) is a block diagram of an example embodiment where an application in a first cloud zone has failed and has been moved to a third cloud zone within a cloud environment.
Figure 1A:
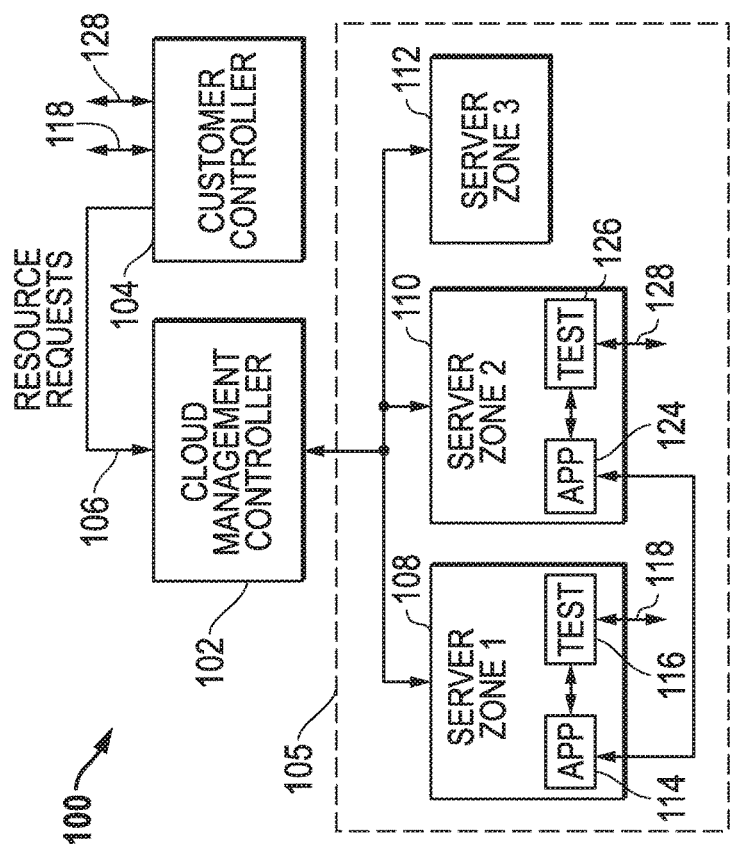
FIG. 1A (Prior Art) is a block diagram of an example embodiment for customer nodes deployed within a cloud environment.

Rather than create paired test agents as done in the prior art solution of FIGS. 1A-B (Prior Art), the embodiment 200 initiates separate resource requests 204 for test agents that are created dynamically based upon deployment information 215. As described herein, the deployment information 215 provides information about the customer processing nodes that are operating within the cloud environment, such as the applications 114B/124/206. This deployment information 215 can include, for example, information concerning geographic location, source/destination addresses such as IP (Internet Protocol) addresses, traffic type, server zone, geographic region, a range of IP addresses, a data center identifier, a server identifier, a cluster identifier, a host identifier, a geo-location identifier, and/or other desired deployment information. The deployment information 215 can also be stored in a database 216 within a data storage system for the test controller 220. For one embodiment, a record is stored for each customer resource, such as applications 124/114B/206 deployed within the cloud environment, and each record includes deployment information for that customer resource. Further, different parameters can be stored for different processing resources deployed within the cloud environment, and the database 216 can be indexed and searchable based upon the data records stored for the deployed customer resources. It is also noted that the test controller 220 can be implemented as part of the customer controller 104, as a stand-alone controller, and/or as a distributed controller including a collection of different sub-controllers. Other variations could also be implemented while still taking advantage of the location based test agent deployment techniques described herein.

When testing is desired, the test controller 220 uses this deployment information 215 within database 216 to determine processing nodes for dynamic placement of test agents. For example, it is assumed for example embodiment 200 that a test is desired for network traffic between an application in the first server zone (ZONE1) 108 and an application in the second server zone (ZONE2) 110. As such, test agents 208 and 210 have been dynamically placed and activated with respect to application 206 and application 124 while no test agent has been placed and activated in the third server zone (ZONE3) 112 for application 114B.

In addition, as described further below for one embodiment, the test controller 220 can be configured to generate reserve requests for test agents within the cloud environment and then subsequently send activation requests for those test agents. The cloud management controller 102 stores these reserve requests within a database that associates them with particular processing nodes already activated within the cloud environment. However, the test agents associated with these reserve requests are not actually placed and activated until the subsequent activation request is sent at a later time by the test controller 220.

In contrast with embodiment 200 of FIG. 2, the prior solution described in FIG. 1B (Prior Art) would have already activated a test agent for application 114A, such as test agent 116A in FIG. 1B (Prior Art). This test agent would have been restarted as test agent 116B when application 114A failed and was moved to the third server zone 112 as application 114B. In contrast with the prior art solution described in FIGS. 1A-B (Prior Art), therefore, test agents 208/210 are placed and activated when needed for test operations by issuing separate test resource requests 204 based upon deployment information 215 for customer resources already deployed within the cloud environment. Once activated, the test agents 208/210 then operate to collect test data associated with network communications and forward this test data through communication channel 212/214 to the test controller 220. The test controller 220 can in turn control the test agents 208/210 through the communication channels 212/214. Advantageously, the customer only pays for the virtual resources used by the dynamic test agents 208/210 after they have been dynamically deployed with respect to application 206 and application 124. Further, when testing becomes idle, these dynamic test agents 208/210 can be removed because they are no longer needed for testing, and they can be re-deployed at a subsequent time if needed. As described herein, the deployment information 215 can be provided to the test controller 220 from monitor agents operating with respect to processing nodes, from the cloud management controller 102, and/or from other sources that track deployment information for processing nodes deployed within the cloud environment.

When the test controller 220 determines a location for deployment of a test agent based upon the deployment information 215, an appropriate test resource request 204 is issued to the cloud management controller 102. The cloud management controller 102 then creates and deploys test agents, such as test agents 208 and 210. For example, the cloud management controller 102 can create each test agent 208/210 by triggering the creation of a new virtual processing platform (e.g., virtual machine, Docker container, etc.) in a location proximal to the applications 206/124 and/or by triggering the co-location of the test agent within an existing virtual processing platform that also includes the applications 206/124. To facilitate this dynamic creation of test agents, the test controller 220 can also be configured to manipulate scheduling provided by the cloud management controller 102 to cause the new test agent to be created and deployed at a desired location within the cloud environment. For example, the test agent can be deployed based upon one or more location attributes associated with the previously deployed processing nodes, can be deployed within a virtual processing platform known to be within a desired server zone associated with deployed processing zones, and/or can be deployed based upon other location information within the deployment information 215.

In one example embodiment, the test controller 220 is adapted to operate/execute on resources for cloud processing nodes (e.g., container engine, virtual machine hypervisor, etc.) within a computing cloud service (e.g., AWS, Azure, Google Cloud, Oracle Cloud, etc.) where applications to be tested also operate within the same computer cloud service. In addition, the test controller 220 can be configured to obtain or release cloud compute resources for test agents via an application programming interface (API) that is exposed by the cloud service provider for such purposes. This API, for example, can allow for test resource requests 204 to include information that specifies a particular location or location attribute (e.g., network subnet identifier, server availability zone, server region, data center location, geographic location, etc.) associated with the requested test resource. In addition, a label can be attached to a new test agent at the time that it is deployed, and the label can include location attribute information (e.g., network subnet identifier, server availability zone, server region, data center location, geographic location, etc.) or other information that can be associated with a desired deployment location.

For one example embodiment, the test controller 220 is configured to adjust or manipulate scheduling rules used by a scheduler within the cloud management controller 102 so as to cause placement of the new test agent within a targeted area of the cloud environment. In this case, the scheduling rules are manipulated such that the newly created test agent is preferentially selected for placement. For example, location specific preferences can be communicated to the cloud management controller 102 using resource fit predicates and priority functions that are interpreted and enforced by the scheduler. A fit-predicate based scheduling rule, for example, may specify a label value/content that is matched/satisfied when selecting a location for placement of a new test agent by the cloud management controller 102. This may be accomplished, for example, using affinity/anti-affinity controls that are available within the cloud management controller 102 (e.g., Kubernetes NodeSelector and NodeAffinity fields). Through intelligent manipulation of such affinity/anti-affinity and/or priority controls, the test controller 220 can effectively control the placement/positioning of a test agents within the cloud environment.

In another example embodiment, the test controller 220 can be configured to manipulate scheduling through the communication of additional information that effectively makes a test agent "unschedulable" for a given location thereby giving preference/priority to the test agent for other desired locations within the cloud environment. For example, with respect to the Kubernetes Kube-ctl protocol, a test agent may be tagged or marked as unschedulable via the use of a "cordon" command/parameter. In this way, the test controller 220 can manipulate the scheduling process, so as to have the schedule preferentially select test agents for desired locations and thereby meet the demands/needs of the overall test system.

In one further example embodiment, the test controller 220 is adapted to analyze the test traffic information received from the test agents and/or monitor agents deployed within the cloud environment, and then to determine whether adjustments should be made to test agents. For example, additional test agents can be added; existing test agents can be moved or deactivated; and/or other adjustments can be made. For example, the test controller 220 may determine that a higher volume of test traffic is needed in a particular server zone and subsequently initiate a provisioning sequence that results in the creation and placement of a new test agent in a desired location. As such, the disclosed embodiments can dynamically adapt to test conditions and/or test results during the course of a test by triggering creation of and/or adjustments to test agents in specific locations within the computing cloud environment based upon the deployment information 215.

Figure 3A:
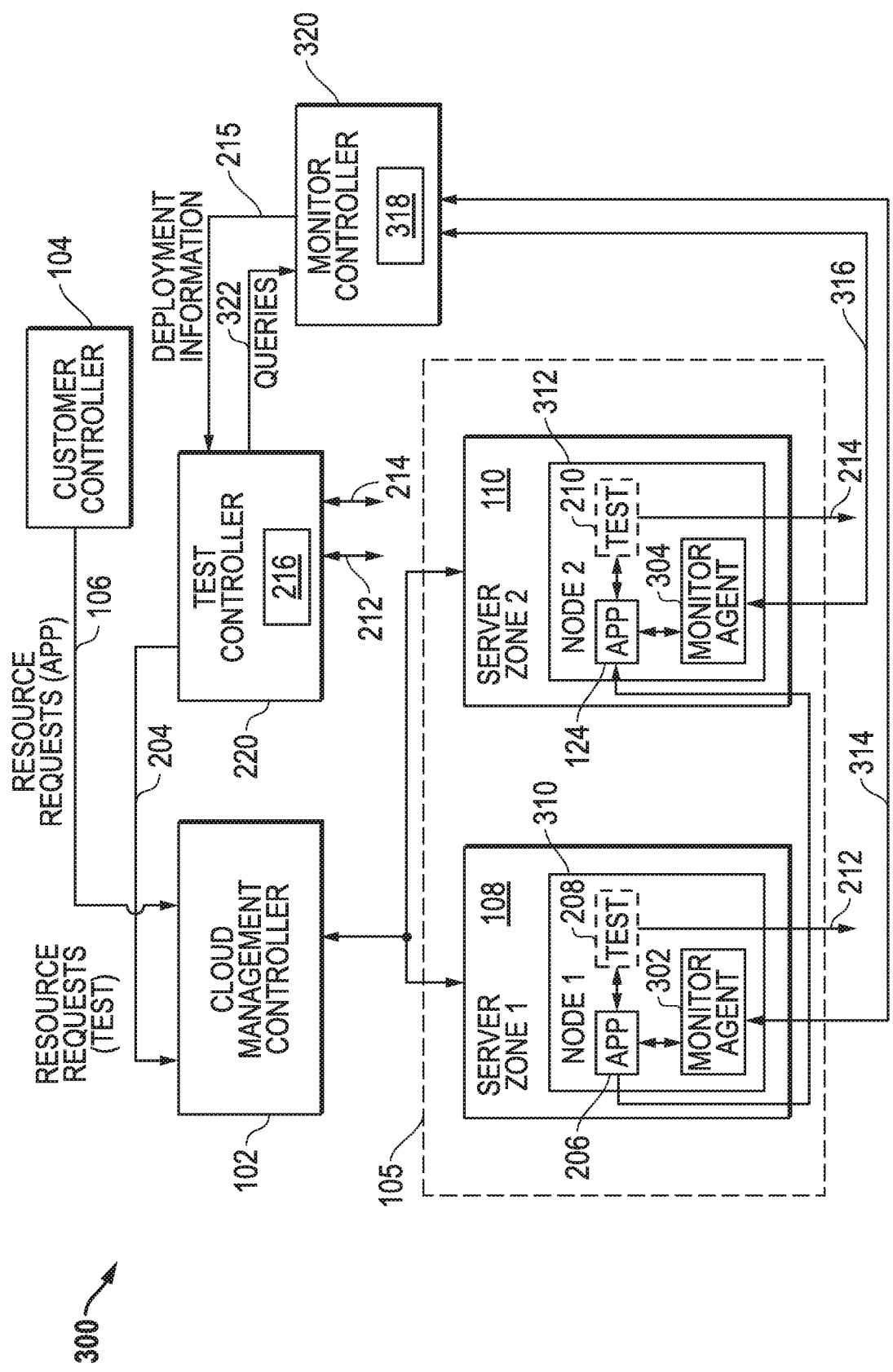
FIG. 3A is a block diagram of an example embodiment for test agents that are dynamically deployed within a cloud environment where deployment information is provided by monitor agents running within the cloud environment.

FIG. 3A is a block diagram of an example embodiment 300 for test agents that are dynamically deployed within a cloud environment where deployment information is provided by monitor agents running within the cloud environment. For the example embodiment 300, an application 206 is running in a first node (NODE1) 310 within the first server zone (ZONE1) 108, and a monitor agent 302 is also running in the first node 310 to monitor packet traffic for the application 206. An application 124 is running in a second node (NODE2) 312 within a second server zone (ZONE2) 110, and a monitor agent 304 is also running in the second node 312 to monitor packet traffic for the application 124. The virtual processing nodes 310/312, for example, can be container engines (e.g., Docker container engines), virtual machine hypervisors, and/or other virtualization layers within which one or more applications, agents, or other virtual instances can run within a common location on a common server. The nodes 310/312 provide virtual processing resources that can be allocated and assigned by the cloud management controller 102 in response to resource requests made by a customer.

Through their monitoring operations, the monitor agents 302/304 gather deployment information about the applications 206/124, respectively. This node-specific deployment information is then communicated from the monitor agents 302/304 to a monitor controller 320 through communication channels 314 and 316, respectively. The monitor controller 320 stores the deployment information in a database 318, and then provides deployment information 215 to the test controller 220. In addition for certain embodiments, the test controller 220 receives this deployment information 215 in response to queries 322 issued to the monitor controller 320 with respect to the deployment information stored in database 318. It is also noted that the deployment information 215 can be communicated from the monitor agents 302/304 directly to the test controller 220 for certain embodiments. The test controller 220 uses the deployment information within database 216 to issue resource requests 204 for placement and activation of test agents 208/210. Once deployed and activated, it is noted that the test agents 208/210 operate to initiate one or more test procedures with respect to their respective processing nodes and applications 206/124 as controlled by the test controller 220. Test results are then collected and sent back to the test controller 220 by the test agents 208/210 through communication channels 212/214, respectively.

The monitor agents 302/304 can determine deployment information including geographic and/or network location information from a variety of sources. For example, relevant location information for the deployed processing nodes 310/312 can be implicitly obtained or inferred from IP (Internet Protocol) address information associated with packets being monitored by the monitoring agents 302/304. As another example, relevant location information for the deployed processing nodes 310/312 can be explicitly obtained from the monitoring agents 302/304 as they query or otherwise actively probe their related applications 206/124 and shared virtualization layer (e.g., virtual machine hypervisor, container engine, and/or other virtualization layer). The monitoring agents 302/304 can then report relevant location information back to the test controller 220 as part of the deployment information 215. It is further noted that the monitor controller 320 can use the communication channels 314/316 to provide instructions or commands to the monitor agents 302/304, and the monitor agents 302/304 can provide other monitor related information back to the monitor controller 320. For example, the monitor agents 302/304 can be used to provide security monitoring of packet traffic with respect to the applications 206/124, respectively. Other variations can also be implemented.

Figure 3B:
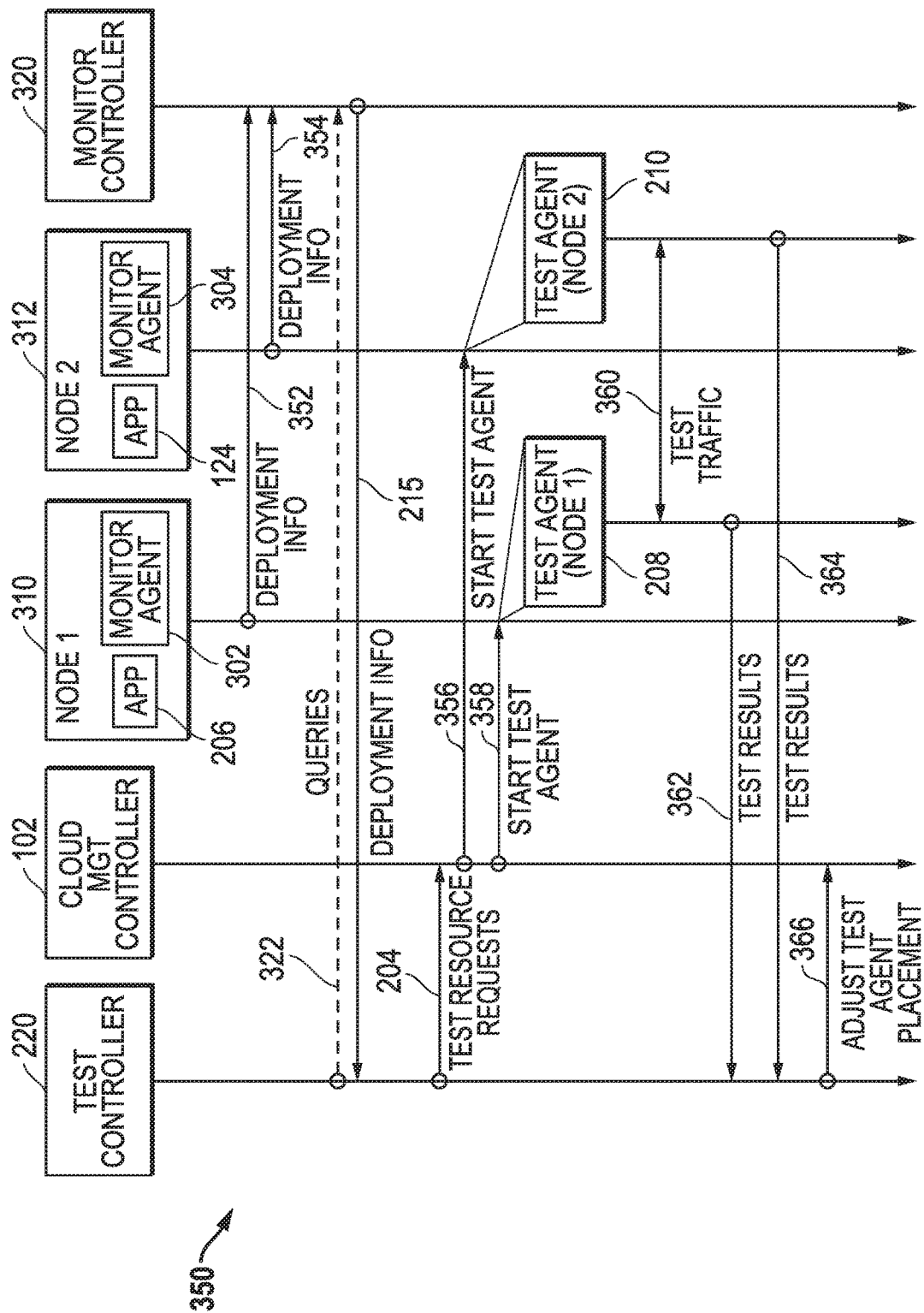
FIG. 3B is a swim lane diagram of an example embodiment for the dynamic activation of test agents based upon deployment information provided by monitor agents.

FIG. 3B is a swim lane diagram of an example embodiment 350 for the dynamic activation of test agents based upon deployment information provided by monitor agents. For embodiment 350, the monitor agent 302 operating in the first node 310 communicates deployment information for the application 206 to the monitor controller 320 as indicated by arrow 352. The monitor agent 304 operating in the second node 312 communicates deployment information for the application 124 to the monitor controller 320 as indicated by arrow 354. The monitor controller 320 then sends deployment information 215 to the test controller 220, and this communication of deployment information 215 can be based upon queries 322 from the test controller 220. The test controller 220 then uses the deployment information 215 to determine locations for test agent placement and activation. Test resource requests 204 are then communicated from the test controller 220 to the cloud management controller 102. The cloud management controller 102 then sends commands to start a test agent 208 in the first node 310 as indicated by arrow 358. The cloud management controller 102 also sends commands to start a test agent 210 in the second node 312 as indicated by arrow 356. As indicated above, the test agents 208/210 can then operate to generate test packet traffic between the application 206 and the application 124 as indicated by test traffic communications 360. The test agent 208 and/or the test agent 210 can then send test results to the test controller 220 as indicated by arrows 362/364. It is further noted that the test controller 220 can use the test results 362/364 to adjust the placement and/or operation of test agents through requests 366 sent from the test controller 220 to the cloud management controller 102.

The embodiments of FIGS. 3A-B, therefore, rely in part upon monitoring agents 302/304 that are configured so as to be created along with applications 206/124 within virtual processing nodes 310/312. In one embodiment, the monitoring agents 302/304 are adapted to report deployment information that identifies the virtual platforms or nodes on which they are operating and therefore on which the applications 206/124 are operating as the monitoring agents 302/304 and the applications 206/124 are co-located. The test controller 220 may use this information to further query the cloud management controller 102 to obtain associated host system location/attachment point information and/or information that can be used to determine the location attributes of the associated host system. Further, the monitor controller 320 and/or the test controller 220 can be configured to analyze source IP address information associated with communications received from monitoring agents 302/304 and use this source IP address information to determine the placement locations for of test agents 208/210. For example, IP address information extracted from packets received from the monitoring agents 302/304 can be used. In addition, IP address information included within secure tunnels constructed between the monitoring agents and the test controller 220 and/or the monitor controller 320 can be used.

In one embodiment, the monitoring agents 302/304 are further adapted to monitor test traffic within the cloud computing environment and track/report traffic and/or flow stats and metrics associated with test agents 208/210 deployed within the cloud during the course of a test for applications under test. The monitoring agents 302/304 then report monitored test traffic and/or monitored test traffic metrics directly to the test controller 220 and/or to the monitor controller 320. In some embodiments, the test controller 220 may use this test monitoring information to create and place new test agents and/or adjust the placement or functioning of existing test agents (e.g., change the test traffic mix, test traffic rate, etc.).

Figure 4A:
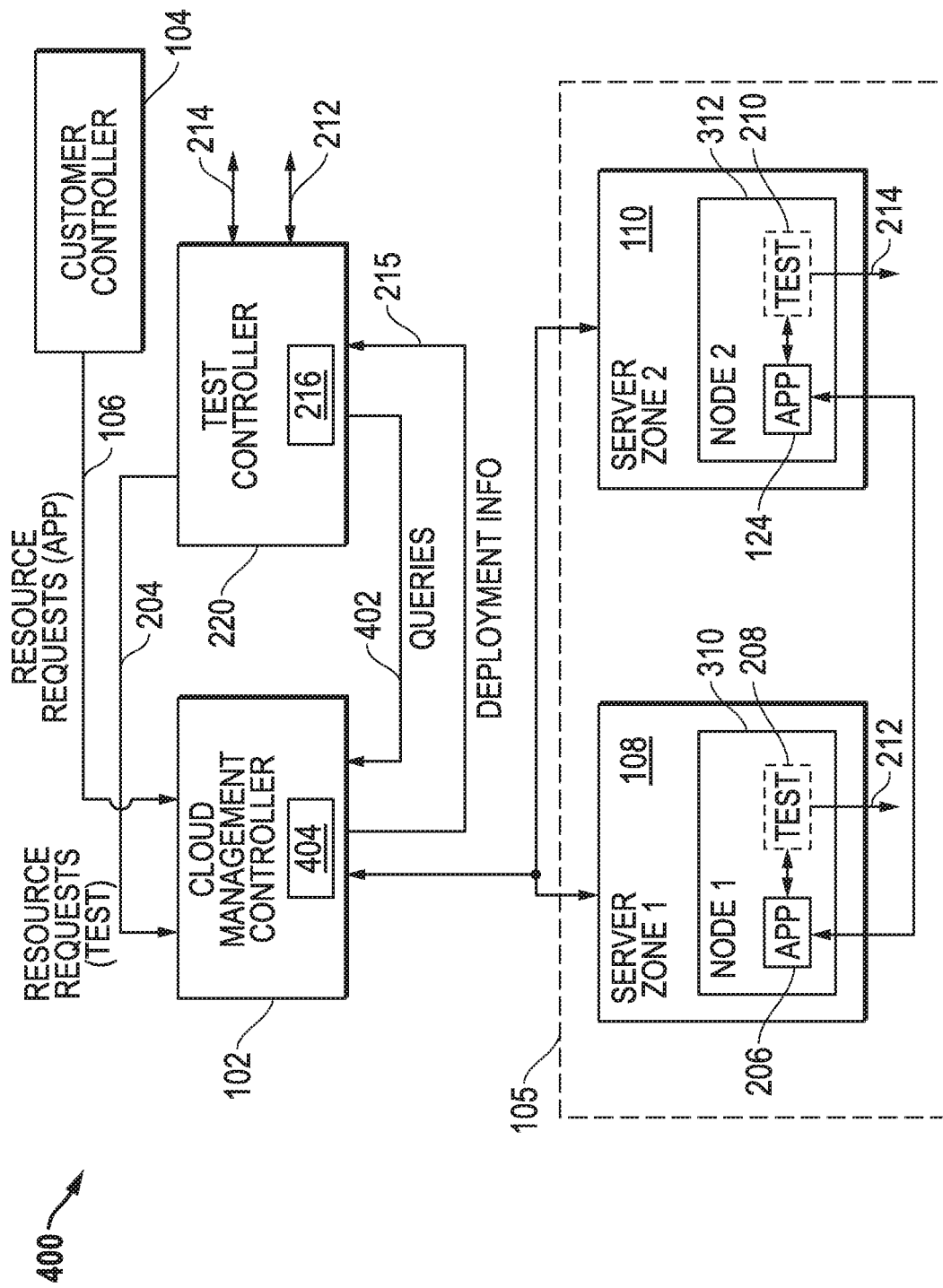
FIG. 4A is a block diagram of an example embodiment for test agents that are dynamically deployed within a cloud environment where deployment information is provided by the cloud management controller.

FIG. 4A is a block diagram of an example embodiment 400 for test agents that are dynamically deployed within a cloud environment where deployment information is provided by the cloud management controller 102. For the example embodiment 400, an application 206 is running in a first node (NODE1) 310 within the first server zone (ZONE1) 108, and an application 124 is running in a second node (NODE2) 312 within a second server zone (ZONE2) 110. Through its operations, the cloud management controller 102 stores deployment information with a database 404 with respect to activated nodes, such as the application 206 and the application 124. This node-specific deployment information 215 is then communicated to the test controller 220, for example, based upon queries 402 from the test controller 220. It is noted, however, that the cloud management controller 102 can also periodically send the deployment information 215 to the test controller 220 without queries 402. The test controller 220 stores the deployment information 215 received from the cloud management controller 102 in a database 216. The test controller 220 uses the deployment information within database 216 to issue test resource requests 204 for placement and activation of test agents 208/210.

Figure 4B:
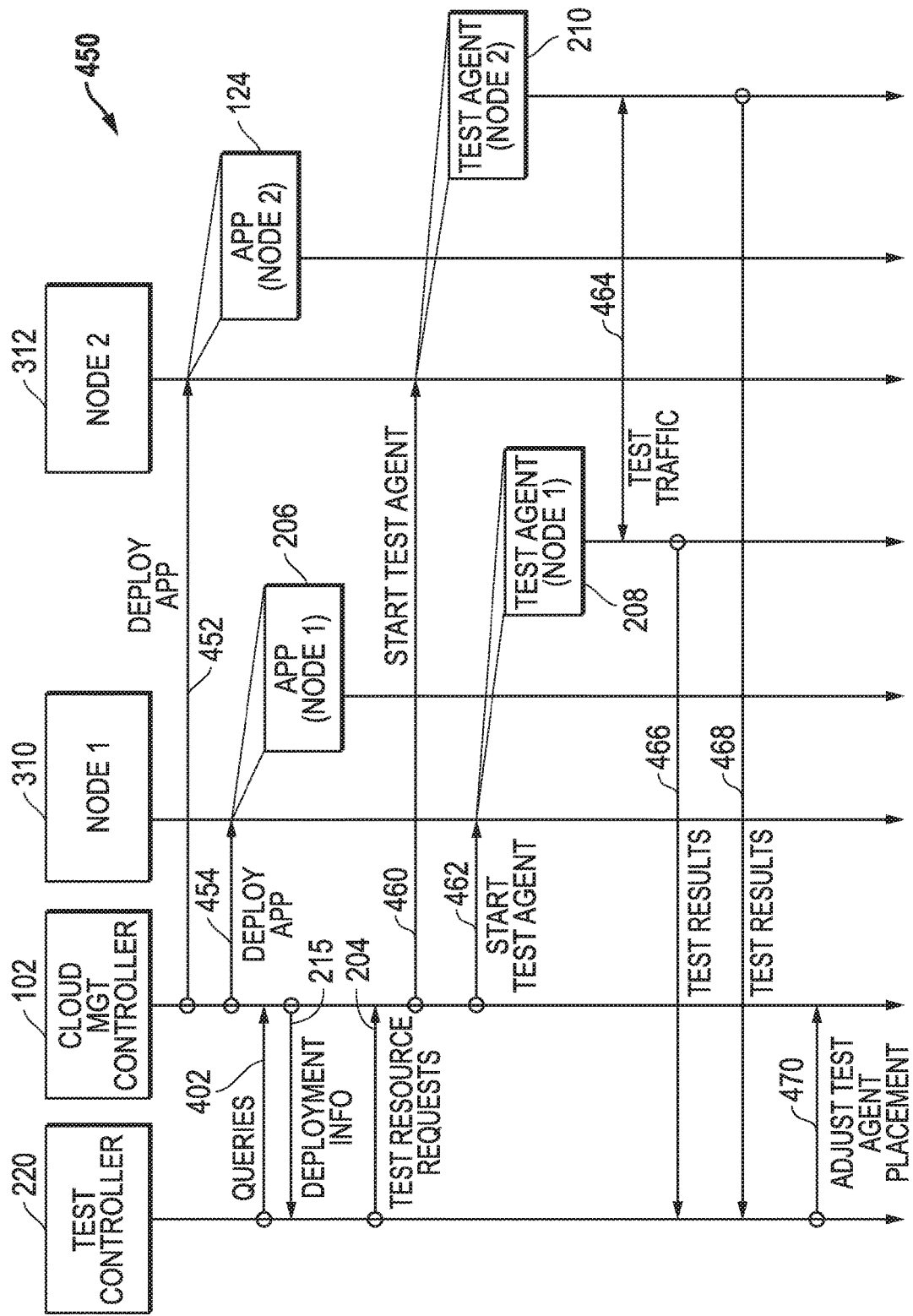
FIG. 4B is a swim lane diagram of an example embodiment for the dynamic activation of test agents based upon deployment information provided by the cloud management controller.

FIG. 4B is a swim lane diagram of an example embodiment 450 for the dynamic activation of test agents based upon deployment information provided by the cloud management controller. For embodiment 450, the application 206 is deployed in a first node 310 as represented by arrow 454. The application 124 is deployed in a second node 312 as represented by arrow 452. The cloud management controller 102 sends deployment information 215 to the test controller 220, and this communication of deployment information 215 can be based upon queries 402 from the test controller 220. The test controller 220 then uses the deployment information 215 to determine locations for test agent placement and activation. Test resource requests 204 are then communicated from the test controller 220 to the cloud management controller 102. The cloud management controller 102 then sends commands to start a test agent 208 in the first node 310 as indicated by arrow 460. The cloud management controller 102 also sends commands to start a test agent 210 in the second node 312 as indicated by arrow 462. As indicated above, the test agents 208/210 can then operate to generate test packet traffic between the application 206 and the application 124 as indicated by test traffic communications 464. The test agent 208 and/or the test agent 210 can then send test results to the test controller 220 as indicated by arrows 466/468. It is further noted that the test controller 220 can use the test results 466/468 to adjust the placement and/or operation of test agents through requests 470 sent from the test controller 220 to the cloud management controller 102.

Figure 5A:
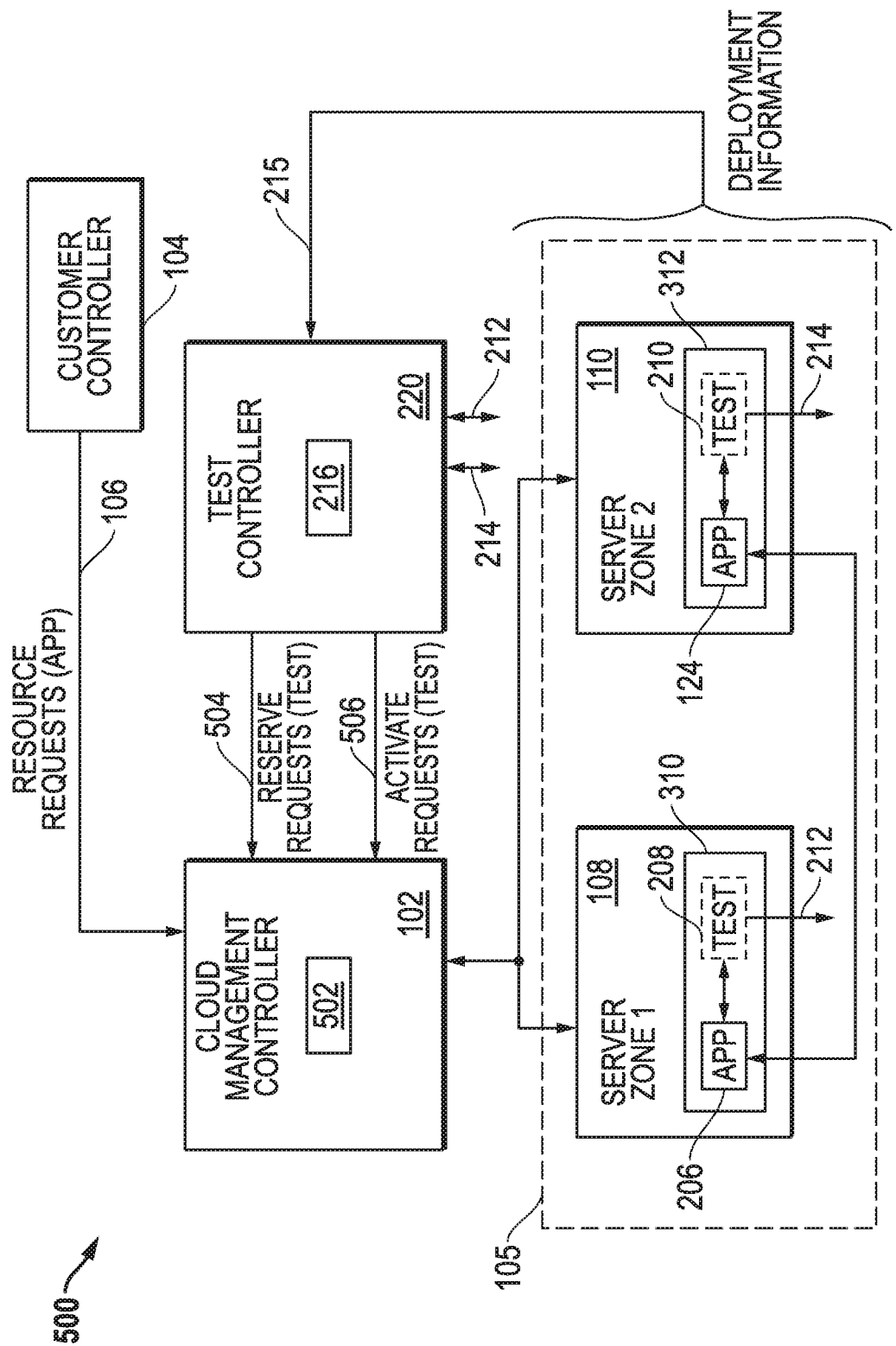
FIG. 5A is a block diagram of an example embodiment for test agents that are dynamically deployed within a cloud environment where the test agents are initially reserved and then later activated by the test controller.

FIG. 5A is a block diagram of an example embodiment 500 for test agents that are dynamically deployed within a cloud environment where the test agents are initially reserved and then later activated by the test controller 220. For the example embodiment 500, an application 206 is running in a first node (NODE1) 310 within the first server zone (ZONE1) 108, and an application 124 is running in a second node (NODE2) 312 within a second server zone (ZONE2) 110. As described herein, the test controller 220 receives deployment information 215 associated with the processing nodes deployed within the cloud environment. The test controller 220 stores the deployment information 215 within database 216 and uses the deployment information to issue test agent reserve requests 504 to the cloud management controller 102. Each reserve node request identifies the processing node, such as nodes 310/312 that include applications 206/124, where a test agent may be desired in the future. The cloud management controller 102 stores these reserve requests within a database 502. At some later point in time, the test controller 220 sends test agent activate requests 506 for previously reserved test agents associated with processing nodes, such as nodes 310/312. For example, the cloud management controller 102 can send commands to the first server zone 108 and/or the first node 310 to start test agent 208 in response to an appropriate activate request 506, and the cloud management controller 102 can send commands to the second server zone 110 and/or second node 312 to start test agent 210 in response to an appropriate activate request 506.

Figure 5B:
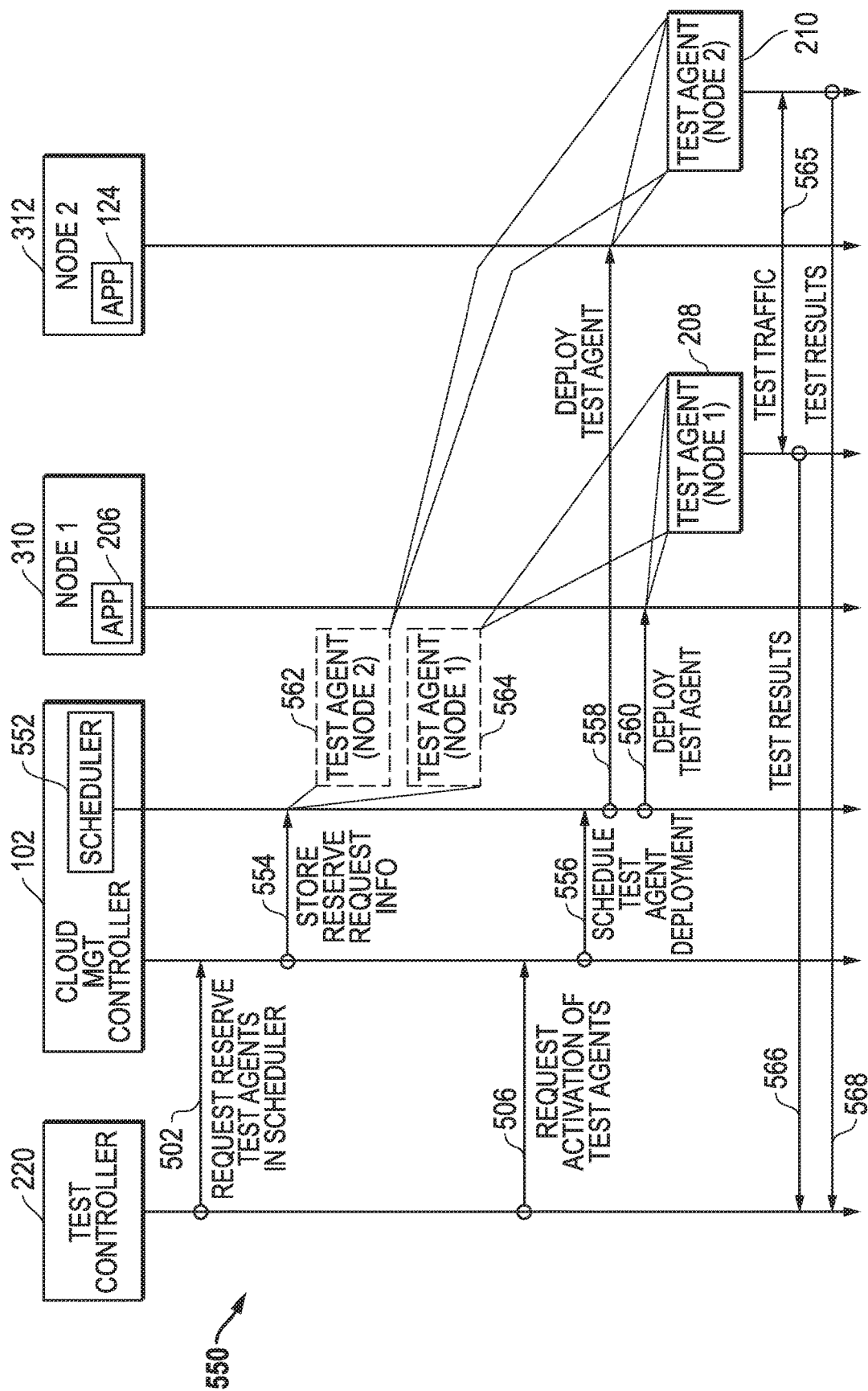
FIG. 5B is a swim lane diagram of an example embodiment where the test agents are initially reserved and then later activated by the test controller.

FIG. 5B is a swim lane diagram of an example embodiment 550 where the test agents are initially reserved and then later activated by the test controller 220. For embodiment 550, the application 206 is deployed in a first node 310, and the application 124 is deployed in a second node 312. The test controller 220 sends reserve requests 504 for reservation of test agents to the cloud management controller 102. The cloud management controller 102 then stores the reserve request information within the scheduler 552 as indicated by arrow 554. For example, a reserve agent record 562 is created and stored for a reserved test agent associated with the second node 312, and a reserve agent record 564 is created and stored for a test agent associated with the first node 310. At some later point, the test controller 220 sends activate requests 506 to the cloud management controller 102 for activation of the test agents 208/210, for example, in the first node 310 and in the second node 312. The cloud management controller 102 then schedules deployment of the test agents 208/210, for example, through a scheduler 552 as indicated any arrow 556. The scheduler 552 for the cloud management controller 102 then sends commands to deploy or start the test agent 208 in the first node 310 based upon the reserve record 564 as indicated by arrow 560. The scheduler 552 for the cloud management controller 102 also sends commands to deploy or start the test agent 210 in the second node 312 based upon the reserve record 562 as indicated by arrow 558. As indicated above, the test agents 208/210 can then operate to generate test packet traffic between the application 206 and the application 124 as indicated by test traffic communications 565. The test agent 208 and/or the test agent 210 can then send test results to the test controller 220 as indicated by arrows 566/568. It is further noted that the test controller 220 can use the test results 566/568 to adjust the placement and/or operation of test agents through additional requests sent from the test controller 220 to the cloud management controller 102.

It is noted that the databases 216, 318, 404 and/or other data described herein can be stored in data storage systems that can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is further noted that the controllers 102/104/220/320, the servers in server zones 108/110/112, and/or other components described herein can be implemented using one or more programmable integrated circuits that are programmed to provide the functionality described herein. For example, one or more processors (e.g., microprocessor, microcontroller, central processing unit, etc.), programmable logic devices (e.g., CPLD (complex programmable logic device), FPGA (field programmable gate array), etc.), and/or other programmable integrated circuits can be programmed with software or other programming instructions to implement the functionality described herein. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein.

Figure 6:
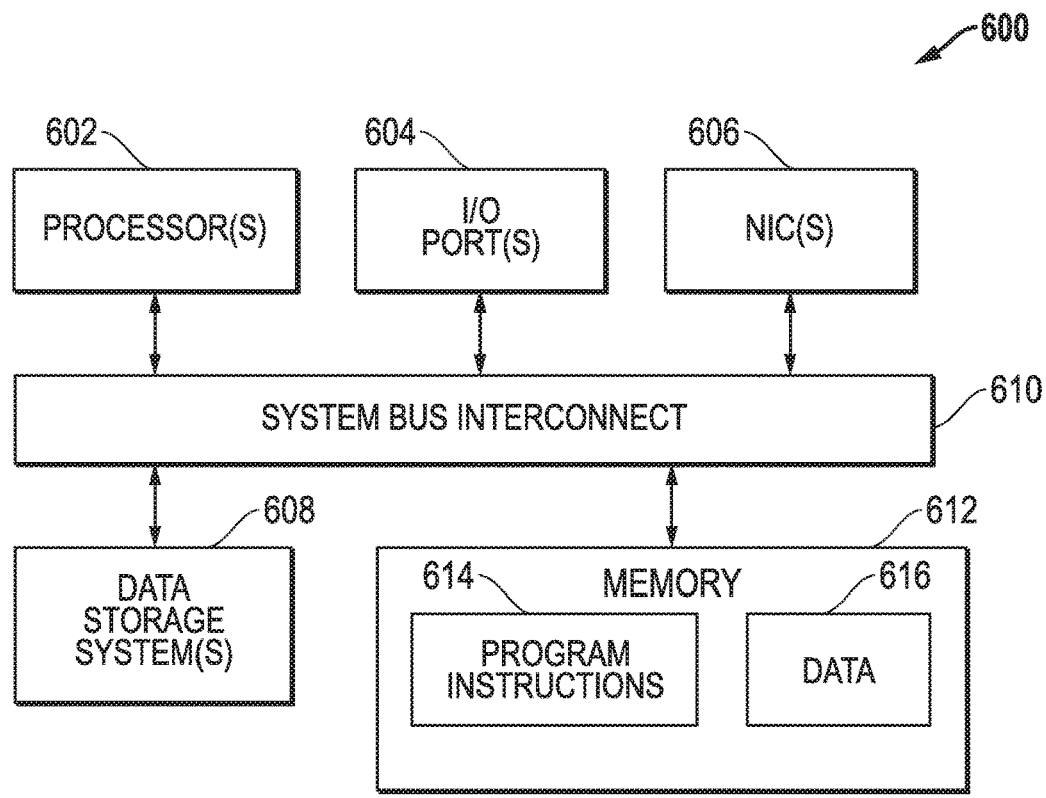
FIG. 6 is a block diagram of an example embodiment for a computing platform that can be used to implement one or more of the components described herein including controllers, servers in server zones, and/or other components.

FIG. 6 is a block diagram of an example embodiment for a computing platform 600 that can be used to implement one or more of the components described herein including the controllers 102/104/220/320, the servers in server zones 108/110/112, and/or other components described herein. The computing platform 600 includes one or more processors 602 or other programmable integrated circuit(s) that are programmed with code or logic instructions to perform the operations and functions described herein. In addition to processors 602 or other programmable integrated circuits, the computing platform 600 can also include one or more input/output (I/O) ports 604, one or more network interface cards (NICs) 606, one or more data storage systems 608, and memory 612 coupled to communicate with each other through a system bus interconnect 610. The memory 612 can include one or more memory devices that store instructions 614 and/or data 616 during operation of the computing platform 600. For example during operation, one or more of the processors 602 or other programmable integrated circuits can load software or program instructions stored in the data storage systems 608 into the memory 612 and then execute the software or program instructions to perform the operations and functions described herein. It is noted that the memory 612 and the data storage system(s) 608 can be implemented using any desired non-transitory tangible computer-readable medium, such as for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing platforms can also be implemented while still taking advantage of the hash-based selection of network packets for packet flow sampling in network communication systems.

Figure 7:
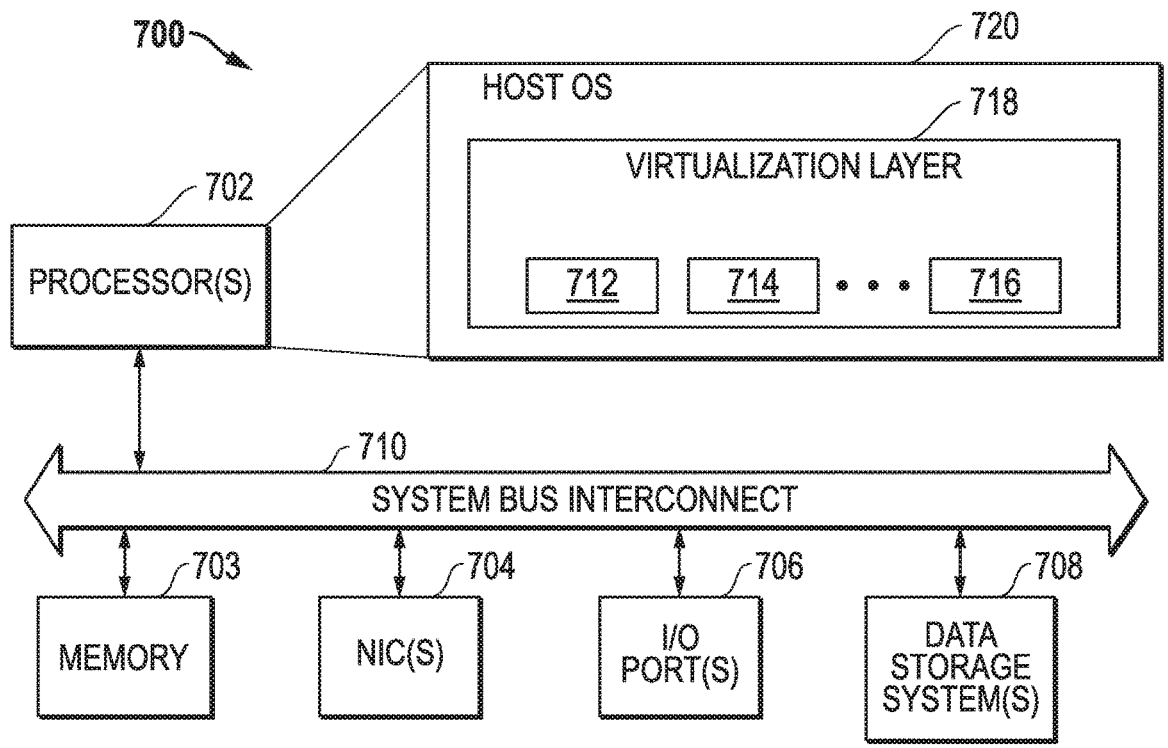
FIG. 7 is a block diagram of an example embodiment for a host server that can provide a virtual processing environment for virtual nodes and/or other virtual processing nodes.

FIG. 7 is a block diagram of an example embodiment 700 for a host server that can provide a virtual processing environment for virtual nodes 310/312 and/or other virtual processing nodes or resources described herein. For the example embodiment depicted, the host server 700 includes one or more processors 702 or other programmable integrated circuits that are programmed to provide a virtualization layer 718 (e.g., virtual machine hypervisor, container engine, etc.) for one or more virtual processing nodes 712, 714, . . . 716 that can implement one or more of the components described herein. The processors 702 or other programmable integrated circuit(s) can be programmed with software code or logic instructions stored in the data storage systems 708 to perform the operations and functions described herein. In addition to the processors 702 or other programmable integrated circuits, the host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 718 and the virtual processing nodes 712, 714, . . . 716 run on top of a host operating system (OS) 720. For example, the host operating system 720, the virtualization layer 718, and the virtual nodes 712, 714, . . . 716 can be initialized, controlled, and operated by the processors or programmable integrated circuits 702 which load and execute software code and/or programming instructions stored in the data storage systems 708 to perform the functions described herein. The virtualization layer 718 for the virtual platforms can be implemented using any desired virtualization layer e.g., hypervisor, container engine, etc.) that provides a virtual processing environment for the virtual processing nodes such as virtual machines (VMs) or instances. For one embodiment, the container engine can be implemented as a Docker container engine for a Linux operating system configured to execute Docker containers. Other variations could also be implemented.

It is noted that the memory 703 can include one or more memory devices that store program instructions and/or data used for operation of the host server 700. For example during operation, one or more of the processors 702 or other programmable integrated circuits can load software or program instructions stored in the data storage systems 708 into the memory 703 and then execute the software or program instructions to perform the operations and functions described herein. It is further noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the hash-based selection of network packets for packet flow sampling in network communication systems.

Figure 8:
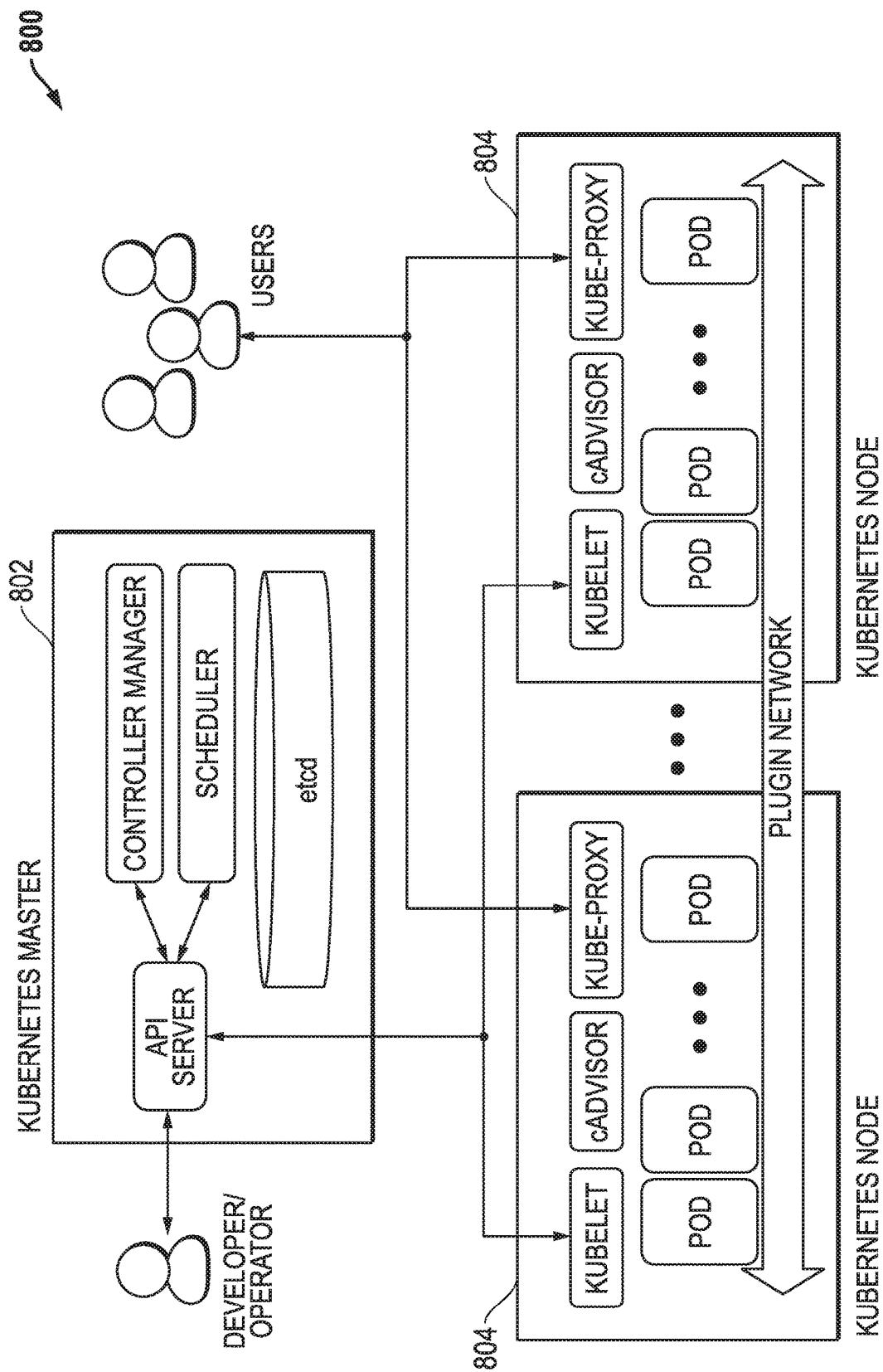
FIG. 8 is a block diagram of an example embodiment for a Kubernetes implementation of a cloud environment for cloud services.

FIG. 8 is a block diagram of an example embodiment 800 for a Kubernetes implementation of a cloud environment for cloud services. FIG. 8 and the description below is based upon a description that can be found at the URL: en.wikipedia.org/wiki/Kubernetes. Kubernetes defines a set of building blocks that collectively provide mechanisms for deploying, maintaining, and scaling applications. The basic scheduling unit in Kubernetes is called a "pod." It adds a higher level of abstraction to containerized components. A pod includes one or more containers that are guaranteed to be co-located on the host machine and can share resources. Each pod in Kubernetes is assigned a unique (within the cluster) IP address, which allows applications to use ports without the risk of conflict. Pods can be manually managed through the Kubernetes API, or their management can be delegated to a controller. Kubernetes follows the master-slave architecture. The components of Kubernetes can be divided into those that manage an individual node and those that are part of the control plane.

The Kubernetes control plane includes a Kubernetes master controller (Master) 802 as the main controlling unit of the cluster of Kubernetes nodes 804 that manages the cluster workload and directs communication across the system. The Kubernetes control plane includes various components, each its own process, that can run on a single master node or on multiple master nodes supporting high-availability clusters. The various components of Kubernetes control plane are as follows: API server, etcd, Controller Manager, and Scheduler. The etcd is a distributed, key-value data store that stores configuration data of the cluster representing the overall state of the cluster at any given point of time. The API server provides both the internal and external interface to Kubernetes, and the API server processes and validates resource requests from customer developers/operators and updates state of the API objects in etcd, thereby allowing customers to configure workloads and containers across worker nodes. The scheduler is the pluggable component that selects which node an unscheduled pod should run on based on resource availability. Scheduler also tracks resource utilization on each node to ensure that workload is not scheduled in excess of the available resources. For this purpose, the scheduler must know the resource requirements, resource availability and a variety of other user-provided constraints and policy directives such as quality-of-service, affinity/anti-affinity requirements, data locality, etc. so that the scheduler can match available resources with workload requests. The Controller Manager is the process that core Kubernetes controllers run in, and these controllers communicate with the API server to manage resources.

Each Kubernetes nodes 804, also known as worker or minion, is the single machine (or virtual machine) where containers (workloads) are deployed. Every node in the cluster runs the container runtime (such as Docker), as well as additional components including: Kubelet, cAdvisor, Kube-Proxy, and Pods. The Kubelet is responsible for the running state of each node and takes care of starting, stopping, and maintaining application containers (organized into pods) as directed by the control plane through the API Server, Controller Manager, and Scheduler. The Kube-Proxy is an implementation of a network proxy and a load balancer, supports the service abstraction along with other networking operation, and routes packet traffic with respect to the users to and from appropriate containers based on IP and port number of the incoming request. The cAdvisor is an agent that monitors and gathers resource usage and performance metrics such as CPU, memory, file and network usage of containers on each node. This usage information is reported back to the Schedule for resource tracking.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the hash-based selection of network packets for packet flow sampling in network communication systems.

Further modifications and alternative embodiments of this invention will be apparent to those skilled in the art in view of this description. It will be recognized, therefore, that the embodiments are not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to deploy test agents in a cloud environment hosted by servers operating to provide cloud services within two or more server zones, comprising:
   at a test controller:
      receiving deployment information about applications operating with the cloud environment;
      analyzing the deployment information to determine locations within the cloud environment for deployment of test agents, the locations being associated with a plurality of the applications and having no deployed test agents associated with the test controller;
      sending resource requests to a cloud management controller to deploy the test agents at the locations, wherein sending the resource requests includes manipulating scheduling rules used by a scheduler in the cloud management controller so as to cause placement of a new test agent within a targeted area of a cloud environment, wherein manipulating the scheduling rules includes communicating information to the scheduler that makes a test agent unschedulable for a given location thereby giving preference for deployment of the test agent in other desired locations in the cloud environment; and
      after deployment of the test agents, receiving test results from the test agents deployed by the cloud management controller at the locations based upon the resource requests.

2. The method of claim 1, wherein the locations determined from the deployment information comprise at least one of geographic locations or network subnet locations.

3. The method of claim 1, wherein the deployment information comprises at least one of a server zone, a geographic region, an IP (Internet Protocol) address, a range of IP addresses, a data center identifier, a server identifier, a cluster identifier, a host identifier, or a geo-location identifier.

4. The method of claim 1, wherein the deployment information comprises information about processes being run by the applications.

5. The method of claim 1, further comprising, at the applications, running monitor agents to monitor network traffic for the applications.

6. The method of claim 5, further comprising, at the monitor agents, collecting the deployment information and sending the deployment information to the test controller.

7. The method of claim 5, further comprising, at the monitor agents, collecting the deployment information and sending the deployment information to a monitor controller and, at the test controller, querying the monitor controller to receive the deployment information.

8. The method of claim 1, further comprising, at the test controller, querying the cloud management controller to receive the deployment information.

9. The method of claim 1, wherein the sending comprises, for each test agent, first sending a reserve request for the test agent to the cloud management controller and subsequently sending an activation request for the test agent.

10. The method of claim 9, further comprising, at the cloud management controller, storing reserve requests for test agents and deploying the test agents only after receiving the activation requests.

11. The method of claim 1, further comprising, at the test controller, analyzing the test results and adjusting deployed test agents based upon the test results, wherein the adjusting includes removing at least one deployed test agent at a location where testing is no longer needed.

12. The method of claim 1, further comprising, at the test controller, controlling the test agents to emulate application traffic.

13. The method of claim 1, wherein the cloud management controller comprises a Kubernetes master controller, and wherein the applications and test agents operate within Kubernetes pods on Kubernetes nodes.

14. A system to deploy test agents in a cloud environment hosted by servers operating to provide cloud services within two or more server zones, comprising:
   a test controller comprising one or more programmable integrated circuits, including at least one of a processor or a programmable logic device, programmed to:
      receive deployment information about applications operating with the cloud environment;
      analyze the deployment information to determine locations within the cloud environment for deployment of test agents, the locations being associated with a plurality of the applications and having no deployed test agents associated with the test controller;
      send resource requests to a cloud management controller to deploy the test agents at the locations, wherein sending the resource requests includes manipulating scheduling rules used by a scheduler in the cloud management controller so as to cause placement of a new test agent within a targeted area of a cloud environment, wherein manipulating the scheduling rules includes communicating information to the scheduler that makes a test agent unschedulable for a given location thereby giving preference for deployment of the test agent in other desired locations in the cloud environment; and
      after deployment of the test agents, receive test results from the test agents deployed by the cloud management controller at the locations based upon the resource requests.

15. The system of claim 14, wherein the locations determined from the deployment information comprise at least one of geographic locations or network subnet locations.

16. The system of claim 14, wherein the deployment information comprises at least one of a server zone, a geographic region, an IP (Internet Protocol) address, a range of IP addresses, a data center identifier, a server identifier, a cluster identifier, a host identifier, or a geo-location identifier.

17. The system of claim 14, wherein the deployment information comprises information about processes being run by the applications.

18. The system of claim 14, further comprising monitor agents configured to operate with the applications to monitor network traffic for the applications.

19. The system of claim 18, wherein the monitor agents are further configured to collect the deployment information and send the deployment information to the test controller.

20. The system of claim 18, wherein the monitor agents are further configured to collect the deployment information and send the deployment information a monitor controller, and wherein the test controller is further programmed to query the monitor controller to receive the deployment information.

21. The system of claim 14, wherein the test controller is further programmed to query the cloud management controller to receive the deployment information.

22. The system of claim 14, wherein the test controller is programmed, for each test agent, to first send a reserve request for the test agent to the cloud management controller and subsequently to send an activation request for the test agent.

23. The system of claim 22, further comprising the cloud management controller, and wherein the cloud management controller is configured to store reserve requests for test agents and to deploy the test agents only after receiving the activation requests.

24. The system of claim 14, wherein the test controller is further programmed to analyze the test results and to adjust deployed test agents based upon the test results, wherein the deployed test agents are adjusted to remove deployed test agents at locations where testing is no longer needed.

25. The system of claim 14, wherein the test controller is further programmed to control the test agents to emulate application traffic.

26. The system of claim 14, further comprising a Kubernetes master controller configured to operate as the cloud management controller and Kubernetes nodes configured to run the applications and the test agents.

* * * * *